United States Patent Office 2,702,811
Patented Feb. 22, 1955

2,702,811

19-NOR-STEROIDS

Frank B. Colton, Chicago, Ill., assignor to G. D. Searle & Co., Chicago, Ill., a corporation of Illinois No Drawing. Application August 28, 1953,
Serial No. 377,245

3 Claims. (Cl. 260—397.45)

The present invention is concerned with a new group of polycyclic organic compounds and, specifically, with the 11,17-dihydroxy-13-methyl-1,2,3,6,7,8,9,10,11,12,13, 14,16,17 - tetradecahydro - 15H - cyclopenta[a]phenanthren-3-ones substituted in the 17-position by an ethynyl or vinyl radical. The compounds which constitute this invention can be represented by the structural formula

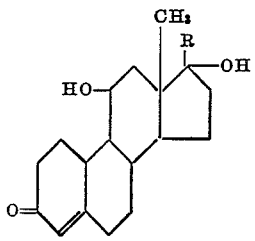

wherein R is an ethynyl or vinyl radical.

One of the preferred methods for preparing these compounds consists in the biochemical oxidation of the corresponding 11-desoxy compounds. The preparation of these starting materials is described in detail in my copending applications Serial No. 286,611, filed May 7, 1952, now Pat. No. 2,655,518, and Serial No. 357,377, filed May 25, 1953. One of the preferred methods of carrying out this biochemical oxidation is the perfusion through a surviving adrenal gland; the principle product of this perfusion is the 11β-hydroxy derivative.

The claimed compositions are valuable therapeutic agents in the treatment of inflammatory diseases and possess a potent lympholytic action. These compounds are superior to naturally occurring adrenocortical steroids in the treatment of syndromes associated with adrenocorticoid imbalance in that they lack undesirable side effects.

The compounds of my invention are also valuable as intermediates in the synthesis of other medicinal agents. Thus, using the method described in my above-mentioned application, Serial No. 286,611, treatment of 11,17-dihydroxy - 13 - methyl - 17 - vinyl - 1,2,3,6,7,8,9,10,11, 12,13,14,16,17 - tetradecahydro - 15H - cyclopenta[a]phenanthren-3-one with phosphorus tribromide yields the 11 - hydroxy - 17 - (β - bromoethylidene) - 1,2,3,6,7,8, 9,10,11,12,13,14,16,17 - tetradecahydro - 15H - cyclopenta[a]phenanthren-3-one. The (β-bromoethylidene) group is converted to a (β-acetoxyethylidene) group by treatment with potassium acetate. The compound thus obtained and its use in further syntheses is described in the copending application by applicant and J. W. Ralls, Serial No. 357,375, filed May 25, 1953.

The following examples will illustrate in further detail the compounds which constitute my invention and methods for their preparation. However, the invention is not to be construed as limited thereby in spirit or scope. It will be obvious to those skilled in the art that many modifications of materials and methods can be practiced without departing from the invention. In each of these examples, temperatures are given in degrees centigrade (° C.) and relative amounts of materials in parts by weight.

Example 1

A stirred solution of 10.6 parts of 3-methoxy-13-methyl - 1,4,6,7,8,9,11,12,13,14,16,17 - dodecahydro-15H-cyclopenta[a]phenanthren-17-one in 700 parts of anhydrous ether and 45 parts of dry toluene is cooled to 0° C. and saturated with dry acetylene. While a slow stream of acetylene is passed through the reaction mixture, a solution of 20 parts of potassium t-amylate in 135 parts of anhydrous pentanol is added in the course of 15 minutes with stirring. Passage of acetylene and stirring are continued for an additional 4½ hours. After standing at 0° C. for 16 hours, the mixture is washed with aqueous ammonium chloride solution until the aqueous phase is neutral, then with water and saturated sodium chloride solution. The organic layer is dried over anhydrous sodium sulfate, filtered and concentrated under vacuum to a residue of about 250 parts. 500 parts of petroleum ether are added and, after standing at 0° C. for an hour, the mixture is filtered. The collected precipitate is recrystallized from ether. The resulting 3-methoxy-13-methyl-17-ethynyl-1,4,6,7,8,9,11,12,13, 14,16,17 - dodecahydro - 15H - cyclopenta[a]phenanthren-17-ol melts at about 181–182° C. The molecular rotation as determined in a 1% chloroform solution is $[\alpha]_D = +65°$. An additional amount of this product can be obtained from the mother liquors by concentration under vacuum followed by addition of petroleum ether.

Example 2

To a refluxing solution of 47.5 parts of 3-methoxy-13 - methyl - 17 - ethynyl - 1,4,6,7,8,9,11,12,13,14,16,17-dodecahydro - 15H - cyclopenta[a]phenanthren - 17 - ol in 3200 parts of methanol and 1000 parts of water are added 240 parts of concentrated hydrochloric acid. Refluxing is continued for an additional 5 minutes after which the solution is maintained at room temperature for 15 minutes. Then 13,000 parts of water are added and the mixture is cooled to 0° C. After standing for several hours at that temperature, the mixture is filtered and the precipitate is dried and crystallized from ethyl acetate. The 13-methyl-17-ethynyl-17-hydroxy-1,2,3,6,7, 8,9,10,11,12,13,14,16,17 - tetradecahydro - 15H - cyclopenta[a]phenanthren-3-one thus obtained melts at about 202–204° C. The molecular rotation, as determined in a 1% chloroform solution, is $[\alpha]_D = -22.5°$. The ultraviolet absorption spectrum of a methanolic solution shows a maximum at 241 millimicrons with a molecular extinction coefficient of 17,100.

Example 3

A solution of 53.7 parts of 13-methyl-17-ethynyl-17-hydroxy - 1,2,3,6,7,8,9,10,11,12,13,14,16,17 - tetradecahydro - 15H - cyclopenta[a]phenanthren - 3 - one in 1500 parts of dioxane and 1000 parts of pyridine is reduced in an atmosphere of hydrogen over 30 parts of a catalyst containing 5% palladium on calcium carbonate. On absorption of one molecule of hydrogen the reduction is stopped and the mixture is filtered. The filtrate is concentrated under vacuum to about 500 parts, diluted with 3000 parts of ether and washed with normal hydrochloric acid until a Congo Red test shows an acidic reaction. The solution is washed successively with water, 5% sodium bicarbonate, water and saturated sodium chloride solution. The ether extract is dried over sodium sulfate, concentrated on the steam bath to about 500 parts and diluted with 800 parts of petroleum ether. After storage at 0° C. for 16 hours, the product is collected on a filter, dried and crystallized from a mixture of ethyl acetate and petroleum ether. The 13-methyl-17 - vinyl - 17 - hydroxy - 1,2,3,6,7,8,9,10,11,12,13,14,16, 17 - tetradecahydro - 15H - cyclopenta[a]phenanthren-3-one thus obtained melts at about 169–171° C. The molecular rotation of an alcoholic solution is $$[\alpha]_D = +36°$$

Example 4

A stirred solution of 1 part of 13-methyl-17-ethynyl-17 - hydroxy - 1,2,3,6,7,8,9,10,11,12,13,14,16,17 - tetradecahydro-15H-cyclopenta[a]phenanthren-3-one in 5000 parts of citrated beef blood and 5000 parts of 0.85% aqueous sodium chloride solution is perfused three times through a surviving beef adrenal gland, cannulated through the vein and having a finely lacerated surface. The perfusate is then extracted with isopropyl acetate.

This extract is washed with water, dried by azeotropic distillation and then concentrated to a residue of about 20 parts and diluted with 380 parts of benzene. This solution is applied to a chromatography column containing 94 parts of silica gel. The column is washed with 1,000 parts of a 10% solution of ethyl acetate in benzene and then eluted with 1,000 parts of a 10% and 1,000 parts of a 20% solution of ethyl acetate in benzene. Concentration of the eluates under vacuum yields unconverted 13-methyl-17-vinyl-17-hydroxy-1,2,3,6,7,8,9,10,11,12,13,14,16,17 - tetradecahydro - 15H - cyclopenta[a]phenanthren-3-one. The column is then washed with 1,000 parts of a 33% and 500 parts of a 50% solution of ethyl acetate in benzene and then eluted with 1,500 parts of a 50% and 500 parts of a 67% solution of ethyl acetate in benzene. Evaporation of the eluate and crystallization of the residue from ethyl acetate yields 11,17-dihydroxy - 13 - methyl - 17 - ethynyl - 1,2,3,6,7,8,9,10,11,12,13,14,16,17 - tetradecahydro - 15H - cyclopenta[a]phenanthren-3-one melting at about 233.5–236.5° C. The molecular rotation of a 1% chloroform solution is $[\alpha]_D = +14°$. The ultraviolet absorption spectrum shows a maximum at 242 millimicrons with a molecular extinction coefficient of 16,800. This compound has the structural formula

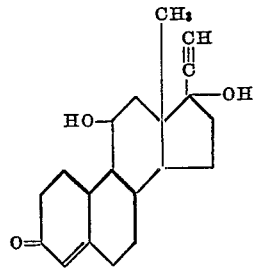

*Example 5*

A solution of 26 parts of 11,17-dihydroxy-13-methyl-17 - ethynyl - 1,2,3,6,7,8,9,10,11,12,13,14,16,17 - tetradecahydro-15H-cyclopenta[a]phenanthren-3-one, in 800 parts of dioxane and 1900 parts of pyridine is hydrogenated over 25 parts of a catalyst containing 5% palladium on calcium carbonate. Upon absorption of one molecule of hydrogen, the reduction is stopped. The reaction mixture is filtered and the catalyst is washed with ether. 30,000 parts of ether are added to the filtrate and the resulting solution is washed successively with 1-N hydrochloric acid, water and saturated sodium chloride solution. After drying over anhydrous sodium sulfate, the solvents are removed under vacuum and the residue is recrystallized from a mixture of ethyl acetate and petroleum ether. The resulting 11,17 - dihydroxy - 13 - methyl - 17 - vinyl - 1,2,3,6,7,8,9,10,11,12,13,14,16,17- tetradecahydro - 15H - cyclopenta[a]phenanthren - 3-one melts at about 187–188° C. The molecular rotation of a 0.5% chloroform solution is $[\alpha]_D = +75°$. The ultraviolet absorption spectrum of a methanolic solution shows a maximum at 242 millimicrons with a molecular extinction coefficient of 17,200. The infrared absorption spectrum shows maxima at 2.78, 6.02, 6.19, 6.9, 7.1, 7.5, 7.9, 8.7, 9.9, 10.8 and 11.2 microns. The compound has the structural formula

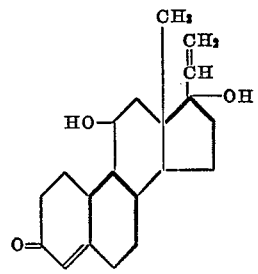

*Example 6*

A solution of 1 part of 13-methyl-17-vinyl-17-hydroxy-1,2,3,6,7,8,9,10,11,12,13,14,16,17 - tetradecahydro - 15H-cyclopenta[a]phenanthren-3-one in 50 parts of 1,3-propanediol is added to 5000 parts of citrated bovine blood and 5000 parts of citrated Tyrode solution containing 500 parts of glucose and a small quantity of terramycin hydrochloride. The resulting mixture is perfused at a temperature of 36.7–37.0° C. five times through ten bovine adrenal glands. The blood is then hemolyzed by successive freezing and thawing and the resulting product is extracted with isopropyl acetate. This extract is washed with water, dried by azeotropic distillation and concentrated under vacuum in a nitrogen atmosphere to a residue of 20 parts. The resulting solution is diluted with 19 times its volume of benzene and poured into a chromatography column containing 95 parts of silica gel. The column is eluted with 1000 parts of a 20% and 500 parts of a 33% solution of ethyl acetate in benzene. Evaporation of these eluates yields unconverted 13-methyl - 17 - vinyl - 17 - hydroxy - 1,2,3,6,7,8,9,10,11,12, 13,14,16,17 - tetradecahydro - 15H - cyclopenta[a]phenanthren-3-one. The column is then eluted with 1000 parts of a 50% and 500 parts of a 67% solution of ethyl acetate in benzene. Evaporation of the solvents yields a partially crystalline residue which, upon crystallization from a mixture of ethyl acetate and petroleum ether, yields 11,17 - dihydroxy - 13 - methyl - 17 - vinyl - 1,2,3, 6,7,8,9,10,11,12,13,14,16,17 - tetradecahydro - 15H - cyclopenta[a]phenanthren-3-one melting at about 190° C. This compound is identical with the product of the preceding example.

I claim:

1. A compound of the structural formula

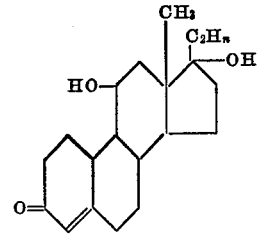

wherein n is an integer selected from the group consisting of one and three.

2. 11,17 - dihydroxy - 13 - methyl - 17 - ethynyl-1,2,3, 6,7,8,9,10,11,12,13,14,16,17 - tetradecahydro - 15H - cyclopenta[a]phenanthren-3-one.

3. 11,17 - dihydroxy - 13 - methyl - 17 - vinyl - 1,2,3, 6,7,8,9,10,11,12,13,14,16,17 - tetradecahydro - 15H - cyclopenta[a]phenanthren-3-one.

No references cited.